May 5, 1931.  T. C. LENNOX  1,804,353
SYSTEM OF ELECTRIC DISTRIBUTION
Filed Nov. 29, 1929
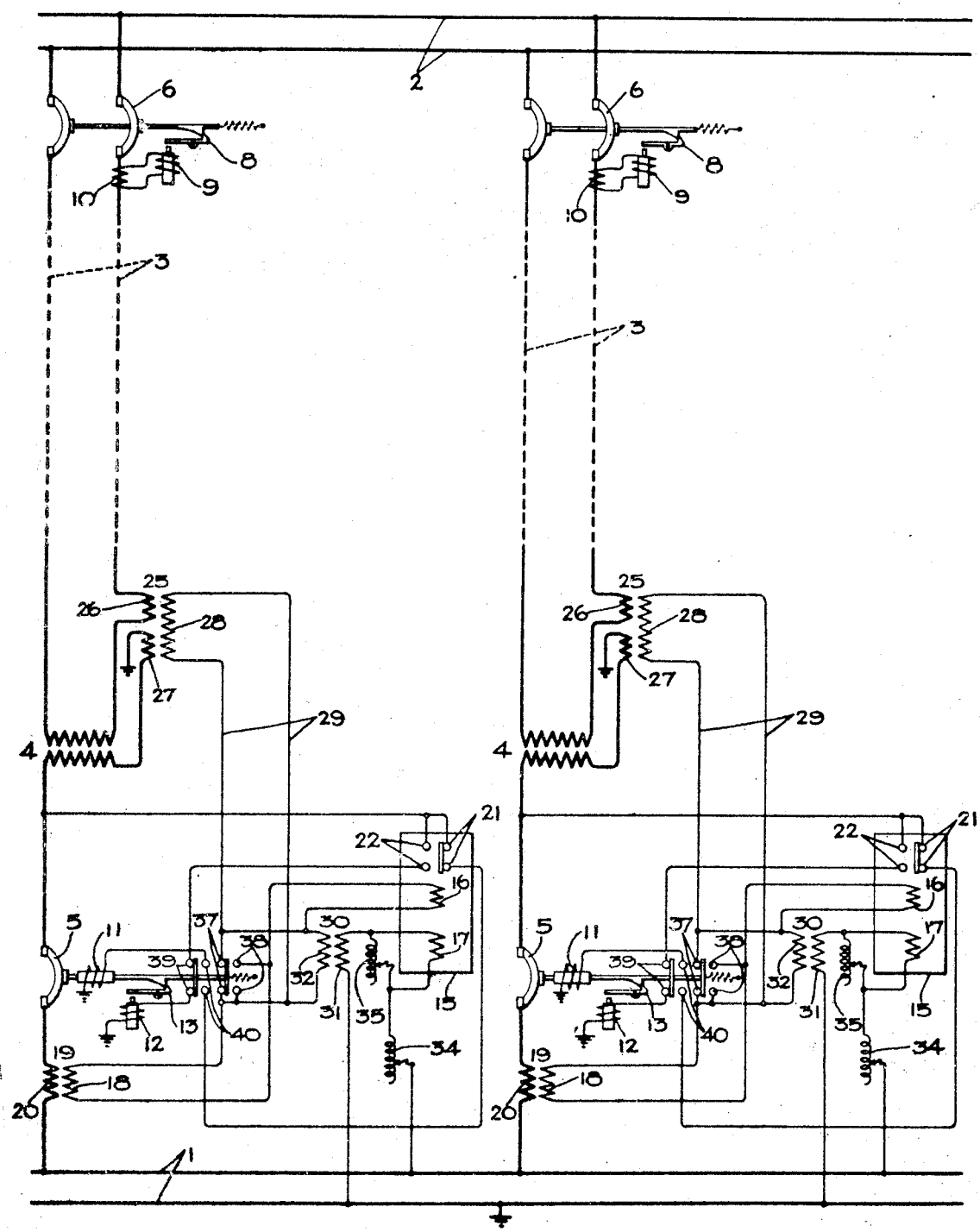
Inventor:
Thomas C. Lennox,
by Charles E. Tulla
His Attorney.

Patented May 5, 1931

1,804,353

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

SYSTEM OF ELECTRIC DISTRIBUTION

Application filed November 29, 1929. Serial No. 410,440.

My invention relates to systems of electric distribution and particularly to alternating current networks which are supplied with current at a plurality of points by means of step-down transformers fed from the same or different sources of current. In such network systems it is desirable to be able to disconnect a transformer from the network whenever a fault occurs in the transformer or the transformer is disconnected from its source of current, and to reconnect the transformer to the network automatically when the transformer is reenergized.

One object of my invention is to provide an improved arrangement for automatically effecting the disconnection of a transformer from a network when a reversal of energy occurs through the transformer and for reconnecting the transformer to the network when normal conditions have been restored in the transformer.

In network systems in use heretofore, such protection has been obtained by using a power directional relay which is so connected when the network breaker is open that one or more of its windings are connected in a high impedance shunt circuit around the main contacts of the open network breaker. Such an arrangement is open to the objection that a metallic connection exists around the open circuit breaker and therefore, a failure of the impedance means in this shunt circuit may allow enough current to flow from the network to the transformer to energize the transformer sufficiently to endanger the lives of men repairing the feeder.

In accordance with my invention I do away with any connection across the open switch whatever and control the reclosing of the network circuit breaker in accordance with the magnetizing current supplied to the network transformer.

For the purpose of explaining the present invention it has been illustrated in the accompanying drawings as applied to an alternating current distribution with an interconnected secondary system but it will be understood that it may be applied to other systems of electric distribution and in general to two interconnected alternating current circuits which are subject to a reversal of energy flow between them.

My invention will be better understood from the following description, when taken in connection with the accompanying drawing, which diagrammatically shows an alternating current distribution system embodying my invention, and its scope will be pointed out in the appended claims.

Referring to the drawing, 1 is a single-phase network which is arranged to be supplied with electric energy from a suitable supply circuit 2 by means of a plurality of feeder circuits 3, two of which are shown in the drawing.

Each feeder circuit 3 includes a step-down transformer 4, the low voltage secondary winding of which is arranged to be connected to the network 1 by means of a suitable circuit breaker 5, and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing the circuit breakers 6.

The circuit breakers 5 may also be of any suitable type, examples of which are well known in the art. As shown in the drawing, each circuit breaker 5 is of the well known latched-in type and includes a closing coil 11 which, when energized, closes the circuit breaker and a trip coil 12 which, when energized, releases a latch 13 which holds the circuit breaker in its closed position.

In order to effect the opening of a secondary circuit breaker 5 when a fault occurs in the associated transformer 4 or feeder circuit 3, or when the associated primary circuit breaker 6 is opened, each secondary circuit breaker 5 has associated therewith a power directional relay 15 which is arranged to effect the energization of the trip coil 12 of the circuit breaker when a predetermined amount of reverse power flows from the network 1 to the associated feeder circuit 3. The power directional relays 15 may be of any suitable type, examples of which are well known in the art. As shown, each power directional relay 15 includes a potential winding 17 which is permanently connected across the network 1 and a current coil 16 which is connected across the secondary winding 18 of a current transformer 19 the primary winding 20 of which is connected in series relation with the secondary winding of the associated power transformer 4 and the network 1 when the associated circuit breaker 5 is closed. Each power directional relay 15 is arranged so that normally it maintains closed its contacts 21 which are in an energizing circuit for the closing coil 11 of the associated circuit breaker 5. When, however, more than a predetermined small amount of reverse power flows from the network 1 to a feeder circuit 3, the associated power directional relay 15 is arranged to open its contacts 21 and closes its contacts 22 which are in an energizing circuit for the trip coil 12 of the associated circuit breaker 5.

In order that each power directional relay 15 may also control the reclosing of the associated secondary circuit breaker 5, the current winding 16 of each relay 15 is arranged to be energized in accordance with the phase and magnitude of the magnetizing current of the associated transformer 4 when the associated secondary circuit breaker 5 is open.

In the embodiment of my invention shown in the drawing I accomplish this result by providing each feeder 3 with a current transformer 25 which is provided with two differentially arranged primary windings 26 and 27 respectively connected in series relation with the primary and secondary windings, of the associated power transformer 4 and a secondary winding 28 connected to a control circuit 29 across which the current winding 16 of the associated relay 15 is arranged to be connected when the associated secondary circuit breaker 5 is open. Since each transformer 25 is energized by the difference between the primary and secondary currents of the associated power transformer 4 the current through the secondary winding 28 varies in phase and magnitude with the magnetizing current of the associated power transformer 4.

In order to insure that the circuit breaker 5 is closed only when the secondary voltage of the associated transformer 4 is such that power will flow from the transformer to the network 1 after the closing of the circuit breaker 5, I provide an arrangement whereby the current winding 16 of the associated relay 15 is also energized when the circuit breaker 5 is open, in accordance with the phase and magnitude of the network voltage. Therefore, the energization of the current winding 16, when the associated secondary circuit breaker 5 is open, varies in accordance with the relative magnitudes and the relative phases of the magnetizing current of the associated transformer and the voltage of the network 1.

In the particular embodiment of my invention shown in the drawing, the energization of each current winding 16 in accord ance with the magnitude and phase of the network voltage is effected by means of a voltage transformer 30, the primary winding 31 of which is connected in series with the voltage winding 17 of the associated relay 15 and the secondary winding 32 of which is connected to the control circuit 29 so that the secondary windings 28 and 32 are cumulatively connected in series. Therefore, the current winding 16 of each relay 15 is energized by a current which depends upon the relative phases and the relative magnitudes of the magnetizing current of the associated transformer 4 and the voltage of the network 1. Furthermore, it is evident that for any given transformer, the phase and magnitude of the magnetizing current bears a predetermined relation to the phase and magnitude of the no load secondary voltage of the transformer. Therefore, by properly designing the circuits of the transformers 25 and 30, current of the proper phase with respect to the current through voltage winding 17, flows through the current winding 16 to maintain the relay contacts 22 open when the secondary voltage of the associated transformer 4 is not of the desired phase and magnitude relative to the network voltage to effect the closing of the associated circuit breaker 5 and to close the relay contacts 21 when the secondary voltage of the associated transformer 4 is of the desired phase and magnitude to effect the closing of the associated circuit breaker 5.

In order to effect the desired phase and magnitude relation between the secondary voltages of the transformers 25 and 30 under predetermined magnetizing current and network voltage conditions, I have shown the adjustable impedances 34 and 35 respectively connected in series and in shunt with the voltage winding 17 of each relay 15. Any other suitable means, examples of which are well known in the art may be employed, however, for this purpose.

In order that the winding 16 may be energized independently of the current in the control circuit 29 when the associated circuit breaker 5 is closed, each circuit breaker 5 is provided with auxiliary contacts 37 which are so connected that when the circuit breaker is closed the contacts 37 short circuit the associated control circuit 29 and connect the current winding 16 of the associated relay 15 across the secondary winding 18 of the associated current transformer 19. Each circuit breaker 5 is also provided with the auxiliary contacts 38 which are so connected that when the circuit breaker is open, the contacts 38 short circuit the secondary winding of the associated current transformer 19 and connect the current winding 16 of the associated relay 15 across the associated control circuit 29.

The operation of the arrangement shown is as follows:

When the circuit breakers 5 and 6 in a feeder 3 are closed and current is being supplied therethrough from the supply circuit 2 to the network 1, the associated power directional relay 15 maintains its contacts 21 closed. The current winding 16 of the associated power directional relay 15 is energized by a current which varies in phase and magnitude with the secondary current of the associated transformer 4.

When an abnormal condition occurs on a feeder 3 or the primary circuit breaker 6 is opened so that the current through the circuit breaker 5 of the feeder reverses, the associated power directional relay 15 opens its contacts 21 and closes its contacts 22. The closing of the contacts 22 connects the trip coil 12 and auxiliary contacts 39 of the associated circuit breaker 5 across the secondary of the associated transformer 4 so that the circuit breaker 5 is opened. When the circuit breaker 5 opens, it opens its contacts 37 and closes its contacts 38 so that the winding 18 of the associated current transformer 19 is short circuited and the current winding 16 of the associated relay 15 is connected across the associated control circuit 29. Therefore, when a circuit breaker 5 is open, the current winding 16 of the associated power directional relay is energized in response to the relative phases and magnitudes of the network voltage and the magnetizing current of the associated transformer 4.

As long as the abnormal condition exists on the feeder and the primary circuit breaker 6 is open the power directional relay maintains its contacts 22 closed. When, however, the primary circuit breaker 6 is closed and the feeder is restored to its normal voltage condition with respect to the network 1, the relay 15 opens its contacts 22 and closes its contacts 21 thereby connecting the closing coil 11 and the auxiliary contacts 40 of the associated circuit breaker 5 across the secondary winding of the transformer 4 to effect the closing of the circuit breaker 5. After the circuit breaker 5 closes and the circuit of its closing coil 11 is opened by the auxiliary contacts 40, it is held in its closed position by its latch 13. When the circuit breaker 5 closes, it effects the opening of its auxiliary contacts 38 and the closing of its auxiliary contacts 37 so that the associated control circuit 29 is short circuited and the current windings 16 of the associated relay 15 is again connected across the secondary winding 18 of its current transformer 19 to effect the opening of the circuit breaker in response to the next power reversal.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, an electric circuit, a power transformer, a circuit breaker for connecting the secondary of said transformer to said circuit, and means energized in accordance with the magnitude of the magnetizing current of said transformer for controlling said circuit breaker.

2. In combination, an electric circuit, a power transformer, a circuit breaker for connecting the secondary of said transformer to said circuit, and means responsive to the relative magnitudes of the magnetizing current of said transformer and the voltage of said circuit for controlling the closing of said circuit breaker.

3. In combination, an electric circuit, a power transformer, a circuit breaker for connecting the secondary of said transformer to said circuit, and means responsive to the relative phases of the magnetizing current of said transformer and the voltage of said circuit for controlling the closing of said circuit breaker.

4. In combination, an electric circuit, a power transformer, a circuit breaker for connecting the secondary of said transformer to said circuit, and means energized in accordance with the magnetizing current of said transformer for controlling said circuit breaker.

5. In combination, an electric circuit, a power transformer, a circuit breaker for connecting the secondary of said transformer to said circuit, and means for controlling the opening and closing of said circuit breaker including a power directional relay having a current winding and means for energizing said current winding in response to the relative phases of the magnetizing current of said transformer and the voltage of said circuit.

6. In combination, an electric circuit, a power transformer, a circuit breaker for connecting the secondary of said transformer to said circuit, and means for controlling the opening and closing of said circuit breaker including a power directional relay having a current winding and means for energizing said current winding in response to the relative magnitudes of the magnetizing current of said transformer and the voltage of said circuit.

7. In combination, an electric circuit, a power transformer, a circuit breaker for connecting the secondary of said transformed to said circuit, and means for controlling the opening and closing of said circuit breaker including a control circuit, means for producing in said control circuit a current proportional to the magnetizing current of said transformer, means for producing in said control circuit a current proportional to the voltage of said circuit and a power directional relay having a current winding connected to said control circuits so as to be energized in response to the difference in phase and magnitude of said currents in said circuit.

8. In combination, a supply circuit, a load circuit, a power transformer, a circuit breaker for connecting the primary of said transformer to said supply circuit, a second circuit breaker for connecting the secondary of said transformer to said load circuit, and means for controlling the closing of said second circuit breaker including a current transformer having a primary winding connected in series relation with the primary of said power transformer, a control circuit connected to the secondary of said current transformer, means for producing in said control circuit a current proportional to the load circuit voltage, and a directional relay having a winding connected to said control circuit.

9. In combination, a supply circuit, a load circuit, a power transformer, a circuit breaker for connecting the primary of said transformer to said supply circuit, a second circuit breaker for connecting the secondary of said transformer to said load circuit, and means for controlling the closing and opening of said second circuit breaker including a current transformer having a primary winding connected in series relation with the primary of said power transformer, a control circuit connected to the secondary of said current transformer, means for producing in said control circuit a current proportional to the load circuit voltage, a directional relay having a voltage winding connected across said load circuit and a current winding, and means controlled by said second circuit breaker for connecting said current winding across said control circuit when said second circuit breaker is open and in series relation with the secondary of said power transformer when said second circuit breaker is closed.

10. In combination, a supply circuit, a load circuit, a power transformer, a circuit breaker for connecting the primary of said transformer to said supply circuit, a second circuit breaker for connecting the secondary of said transformer to said load circuit, and means for controlling the closing of said circuit breaker including a current transformer having two primary windings respectively connected in series with the primary and secondary of said power transformer, a potential transformer having its primary connected across said load circuit and its secondary connected to the secondary of said current transformer, and a power directional relay having a winding connected in parallel across the secondaries of said current and potential transformers.

11. In combination, a supply circuit, a load circuit, a power transformer, a circuit breaker for connecting the primary of said transformer to said supply circuit, a second circuit breaker for connecting the secondary of said transformer to said load circuit, and means for controlling the closing and opening of said circuit breaker including a current transformer having two primary windings respectively connected in series with the primary and secondary of said power transformer, a potential transformer having its primary connected across said load circuit, a control circuit connecting the secondaries of said current and potential transformers in series, a second current transformer having its primary winding connected in series with the secondary of said power transformer, a power directional relay having a voltage winding connected to said load circuit and a current winding, and means controlled by said second circuit breaker for connecting said current winding across said control circuit when said second circuit breaker is open and for connecting said current winding across the secondary of said second current transformer when said second circuit breaker is closed.

12. In combination, a supply circuit, a load circuit, a power transformer, a circuit breaker for connecting the primary of said transformer to said supply circuit, a second circuit breaker for connecting the secondary of said transformer to said load circuit, and means for controlling the closing and opening of said circuit breaker including a current transformer having two primary windings respectively connected in series with the primary and secondary of said power transformer, a potential transformer having its primary connected across said load circuit, a control circuit connecting the secondaries of said current and potential transformers, a second current transformer having its primary winding connected in series with the secondary of said power transformer, a power directional relay having a voltage winding connected in series with the primary of said potential transformer and a current winding, and means controlled by said circuit breaker for connecting said current winding across said control circuit and for short circuiting the secondary of said second current transformer when said second circuit breaker is open and for connecting said current winding across the secondary of said second current transformer and for completing a short circuit across the secondary of said first mentioned current transformer when said second circuit breaker is closed.

13. In combination, an electric circuit, a power transformer, a circuit breaker for connecting the secondary of said transformer to said circuit, and means for controlling the opening and closing of said circuit breaker including a power directional relay having a current winding, and means for connecting said winding in series relation with the secondary of said transformer when said circuit breaker is closed and in series relation with the primary of said transformer when said switch is open.

14. In combination, an electric circuit, a power transformer, a circuit breaker for connecting the secondary of said transformer to said circuit, and means for controlling the opening and closing of said circuit breaker including a power directional relay having a voltage winding connected to said circuit and a current winding, a current transformer having a primary winding connected in series with the primary of said power transformer, a second current transformer having its primary connected in series with the secondary of said power transformer, a power directional relay having a current winding, and means controlled by said circuit breaker for connecting said current winding across the secondary of said first mentioned current transformer when said circuit breaker is open and across the secondary of said second current transformer when said circuit breaker is closed.

15. In combination, an electric circuit, a power transformer, a circuit breaker for connecting the secondary of said transformer to said circuit, and means for controlling the closing of said circuit breaker including a power directional relay having a voltage winding and a current winding, a current transformer having two differential windings respectively energized in response to the currents through the primary and secondary windings of said power transformer and a third winding and means controlled by said circuit breaker for connecting said current winding across said third winding when said switch is open.

16. In combination, an electric circuit, a power transformer, a circuit breaker for connecting the secondary of said transformer to said circuit, and means for controlling the closing of said circuit breaker including a power directional relay having a voltage winding and a current winding, a current transformer having two differential windings respectively energized in response to the currents through the primary and secondary windings of said power transformer and a third winding, a second current transformer having its primary winding connected in series relation with the secondary winding of said power transformer, and means controlled by said circuit breaker for connecting said current winding across said third winding of said first mentioned current transformer when said circuit breaker is open and for connecting said current winding across the secondary of said second current transformer when said circuit breaker is closed.

In witness whereof, I have hereunto set my hand this 26th day of Nov., 1929.

THOMAS C. LENNOX.